Nov. 17, 1925.

H. M. BOEHM

FLOWERPOT

Filed Aug. 18, 1924

1,561,824

INVENTOR
H. M. BOEHM
BY
ATTORNEYS

Patented Nov. 17, 1925.

1,561,824

UNITED STATES PATENT OFFICE.

HENRY MARTIN BOEHM, OF MINNEAPOLIS, MINNESOTA.

FLOWERPOT.

Application filed August 18, 1924. Serial No. 732,839.

*To all whom it may concern:*

Be it known that I, HENRY MARTIN BOEHM, a citizen of the United States, and a resident of Minneapolis, county of Hennepin, State of Minnesota, have invented a new and useful Improvement in Flowerpots, of which the following is a full, clear, and exact description.

My invention relates to improvements in flower pots, and it consists in the combinations, constructions, and arrangements herein described and claimed.

An object of my invention is to provide a flower pot which has novel means for draining any excess water from the pot, whereby the water will not collect in the bottom of the pot and rot the roots of the plants, which is usually the case in the standard flower pots.

A further object of the invention is to provide a flower pot in which a saucer is provided for receiving the excess water from the flower pot, the rim of the saucer being spaced below the bottom of the flower pot, whereby the water in the saucer will drain therefrom before it will contact with the exterior surface of the flower pot. In this way the water has no chance to mar configurations on the flower pot.

A further object of my invention is to provide a flower pot in which the saucer has a depression for receiving the supporting flange of the flower pot, whereby the flower pot is automatically centered with respect to the saucer.

A further object of my invention is to provide a device of the type described which is simple in construction, durable and efficient for the purpose intended, and which is not likely to get out of order easily.

Other objects and advantages will appear in the following specification, and the novel features of the invention will be particularly pointed out in the appended claims.

Figure 1:
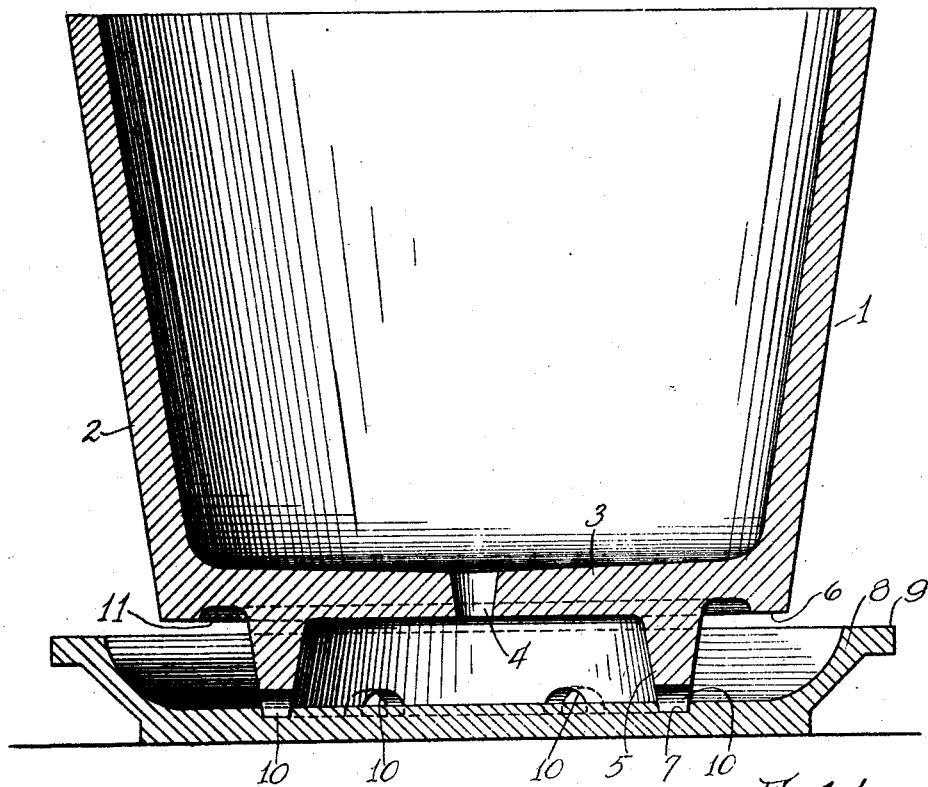
Figure 2:
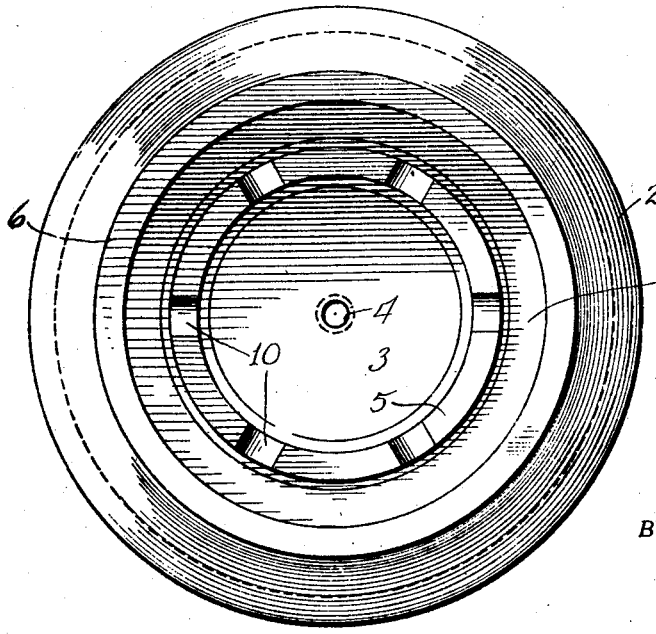

My invention is illustrated in the accompanying drawings, forming part of this application, in which Figure 1 is a vertical section through the device, and Figure 2 is a bottom plan view of a flower pot illustrated on a slightly reduced scale from that shown in Figure 1.

In carrying out my invention I provide a flower pot 1 which is provided with the usual tapering sides 2 and sloping base 3. An outlet opening 4 is disposed in the base 3 and is adapted to drain any excess water from the flower pot. In Figure 1 it will be clearly seen that the flower pot is provided with a flange 5 that extends downwardly from the base 3 and thus positions the lower edge 6 of the wall 2 quite a distance above the supporting surface. In the present instance, the flange 5 is received in a groove 7 in a saucer 8. It should be noted that the rim 9 of the saucer is spaced below the edge 6 and therefore any water within the saucer 8 will drain over the rim 9 before it comes into contact with the exterior surface of the wall 2. In this way, I provide a novel means for preventing the water from defacing any design that is on the exterior surface of the wall 2. The flange 5 is provided with recesses 10 that permit the water to flow into the portion of the saucer 8 disposed around the exterior wall of the flange 5.

From the foregoing description of the various parts of the device the operation thereof may be readily understood. It is obvious that the shape of the flower pot may be circular, oval, angular, or rectangular in form, and of various dimensions. The principal object of the invention is to position the edge 6 above the top of the rim 9, whereby it is impossible for the water within the saucer to come in contact with the exterior surface of the wall 2. The saucer 8 is shaped so as to conform with the general appearance of the flower pot 1. As heretofore stated, the groove 7 provides a novel means for centering the flower pot 1 with respect to the saucer. It will be noted from Figure 1 that the edge 6 extends slightly below the bottom 3 and therefore provides an annular groove 11. In Figure 2 I have shown the flange 5 as being provided with six recesses 10, but it is obvious that this number may be changed at will. The special shape of the edge 6 and the flange 5 does not in the least interfere with the general appearance of the flower pot. The flange 5 is merely for the purpose of disposing the edge 6 the required distance above the supporting surface, which in this instance, is the bottom of the saucer 8. The device is extremely simple in construction and may be cast in two pieces.

I claim:

1. A flower pot comprising a body portion having a dirt retaining wall, a flange depending from the bottom of said flower pot, a saucer having a groove therein adapted to receive said flange, said flange spacing the lower edge of said wall above the top of said saucer, said body portion having an opening to permit water to drain therefrom, and said flange having recesses therein to permit water to pass therethrough.

2. A flower pot comprising a body portion having a wall that depends below the bottom of the body portion, a flange carried by said body portion and having recesses in the bottom thereof, a saucer having means for centering the body portion of the flower pot with respect to the saucer, said recesses permitting the water that seeps from the flower pot to pass into that portion of the saucer disposed exteriorly of the flange, and said flange spacing the lower edge of the wall above the top of the saucer, whereby the water will drain from the saucer instead of backing up into the lower pot or contaminating the exterior surface of the wall.

HENRY MARTIN BOEHM.